Nov. 11, 1930. F. F. DORSEY ET AL Re. 17,858

POWER TRANSMISSION MECHANISM

Original Filed June 4, 1923

Inventors
Farnum F. Dorsey
and Chester W. Crumline
By Spencer Hardman and Fehr
their Attorneys Reissued Nov. 11, 1930 Re. 17,858

UNITED STATES PATENT OFFICE

FARNUM F. DORSEY, OF SOUTH ORANGE, NEW JERSEY, AND CHESTER W. CRUMRINE, OF ROCHESTER, NEW YORK, ASSIGNORS, BY MESNE ASSIGNMENTS, TO NORTH EAST APPLIANCE CORPORATION, OF ROCHESTER, NEW YORK, A CORPORATION OF NEW YORK

POWER-TRANSMISSION MECHANISM

Original application filed June 4, 1923, Serial No. 643,231. Renewed December 9, 1925. Original No. 1,590,150, dated June 22, 1926. Application for reissue filed April 11, 1930. Serial No. 443,570.

This invention relates to power-transmission mechanism used to connect an internal-combustion engine temporarily with a prime-mover, such as an electric motor, for the purpose of cranking or starting the engine.

For the purpose in question it is common to use a pinion movable, in the direction of its axis, into and out of mesh with a gear-wheel connected with the crank-shaft of the engine, and to shift this pinion by manually-operable means. In so shifting the pinion it often happens that the teeth fail to mesh, by reason of direct engagement of the ends of the teeth, and in such case it is necessary to impart a partial rotation to the pinion to bring its teeth into line with the tooth-spacers in the gear.

The principal object of the present invention is to provide a gear, of the type just referred to, with simple and effective means for rotating the pinion for the purpose aforesaid. Another object of the invention is to produce a mechanism of simple and compact construction, and particularly to embody therein an overruning clutch to prevent the mechanism from transmitting rotation from the gear to the motor.

The means by which these objects are attained are set forth hereinafter, and the invention resides in these means as defined in the succeeding claims.

Figure 1:
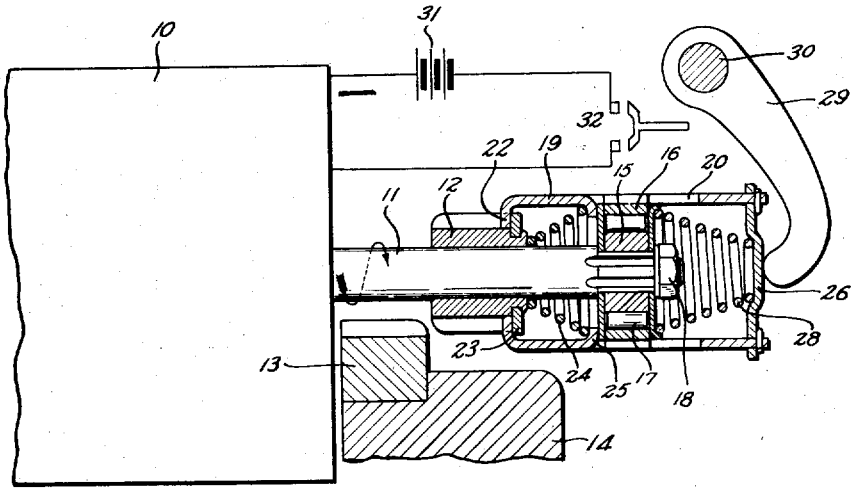
Figure 2:
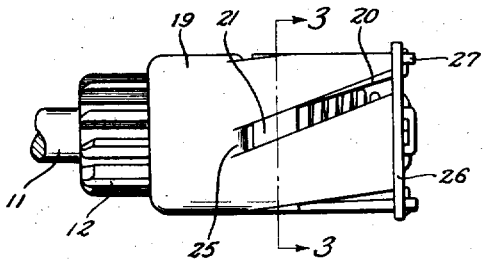
Figure 3:
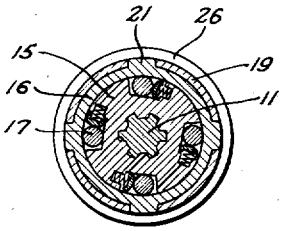
Figure 4:
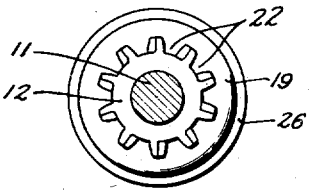
Figure 5:
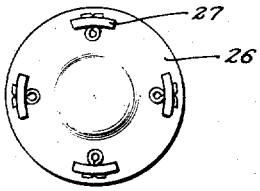

In the drawings, Fig. 1 is a partly diagrammatic side-elevation of an engine starting outfit embodying the present invention, with the power-transmission mechanism in longitudinal section. Fig. 2 is a side-elevation of the power-transmission mechanism. Fig. 3 is a cross-section of the mechanism on a plane passing through the clutch. Figs. 4 and 5 are end-elevations of the power-transmission mechanism.

The invention is illustrated as embodied in a system in which an electric motor 10 furnishes power for cranking an engine. The armature-shaft 11 of the motor carries a pinion 12 which is shifted into and out of mesh with a gear-ring 13 carried by the fly-wheel 14 of the engine.

The end of the shaft 11 is splined, and the inner member 15 of a roller-wedge clutch is fixed thereon by a nut 18. Spring-pressed rollers 17, working in sockets in the clutch-member 15, cooperate with the outer clutch member 16 in the usual manner. The movements of the pinion 12 are controlled through a shifting-sleeve 19 which embraces the outer clutch-member. This sleeve has four helical slots 20, which are engaged by integral projections 21 on the outer clutch-member. The left-hand end of the sleeve is partially closed in and is provided with teeth 22 which fit loosely between the teeth of the pinion. A flange 23 on the inner end of the pinion prevents the sleeve from withdrawing from engagement with the pinion.

A spring 24 is enclosed within the sleeve, and it rests at one end, against four integral lugs 25 bent inwardly on the sleeve at the ends of the slots 20. The other end of the spring presses against the end of the pinion, and thus normally retains the pinion in the position shown, in which it is projected fully from the sleeve.

The outer end of the sleeve is closed by a plate 26, secured in place by tangs 27 on the sleeve. These tangs pass through slots in the plate and are secured by cotters. A spring 28, interposed between the plate 26 and the clutch, tends to hold the plate and the sleeve in the position shown, at the right-hand limit of their movement and with the pinion disengaged from the gear.

Operation of the mechanism is accomplished through a lever-arm 29 fixed to a rock-shaft 30, which may be turned in any suitable manner, when the engine is to be started, in a direction to press the arm against the plate 26 and force the sleeve to the left.

The motor 10 is supplied with current from a battery 31, and the circuit is controlled by a switch 32. This switch is shown, diagrammatically, in position to be engaged and closed by the arm 29 as the arm completes its operative movement.

The mechanism operates as follows: when the arm 29 swings to the left the sleeve is moved axially with respect to the clutch, and the projections 21 traverse the slots 20. Since the motor is at this time stationary, the projections impart a slight rotative movement to the sleeve simultaneous with its axial movement.

Both motions of the sleeve are transmitted simultaneously to the pinion, the axial movement through the spring 24 and the rotative movement through the teeth 22. If the teeth of the pinion chance to engage properly between the teeth of the gear, rotation of the pinion and the sleeve is thereby arrested. During the completion of the axial movement of the sleeve the slots 20 cause the projections 21 to move, thus imparting a slight reverse rotation to the motor-shaft. The rotating movement of the pinion is thus yielding in character, owing to the fact that it occurs with a torque limited by the frictional resistance to rotation of the motor-shaft.

As the movement of the shifting-sleeve is completed the switch 32 is closed, and the motor starts. When the engine starts the rapid rotation imparted from it to the pinion is transmitted to the sleeve and the outer clutch-member, but the latter overruns on the rollers of the clutch and no rotation is imparted to the motor.

When the sleeve is shifted, as above described, to engage the pinion with the gear, if the ends of the gear-teeth collide the axial movement of the pinion is arrested, as it is imparted to the pinion yieldingly, through the spring 24. The movement of the sleeve continues, however, since the teeth 22 can slide along the pinion. Accordingly, the sleeve continues to rotate and to turn the pinion, so that presently the pinion-teeth are brought to meshing position. Thereupon the spring 24 expands and forces the pinion quickly into mesh, and the operations are continued as before described.

As soon as the engine starts the arm 29 may be swung back to normal position. This permits the spring 28 to expand and draw the sleeve and the pinion back to idle position, while the switch 32 is opened and the motor stops.

We are aware that mechanisms of the type in question have been previously proposed, in which rotation and axial movement are both imparted manually to the pinion, but such previous mechanisms have been arranged to impart only axial movement to the pinion unless and until it is arrested by engagement with the gear, and thereafter to rotate the pinion in consequence of such engagement. The present construction is novel in the respect that in it axial movement and rotation of the pinion occur simultaneously unless and until the axial movement is arrested, and that relative rotation of the pinion and the motor-shaft occur throughout the shifting operation.

The invention claimed is:

1. Power-transmission mechanism comprising: a gear; a driving pinion movable axially into and out of mesh with the gear; and manually-operable means for simultaneously rotating said pinion and moving it axially, said means being yieldable as to each of such motions so that either may continue alone when the other is arrested.

2. Power-transmission mechanism comprising: a gear; a driving pinion movable axially into mesh with the gear; yielding means for rotating the pinion; yielding means for moving the pinion axially; and manually-operable means for actuating both said yielding means simultaneously.

3. Power-transmission mechanism comprising, in combination with a gear and a motor-driven shaft, a pinion slidable, upon said shaft, into mesh with said gear; an overrunning clutch, for imparting rotation from said shaft to said pinion; means for imparting, yieldingly, said sliding movement to the pinion; and mechanism, including said clutch, for producing positive relative rotation of the pinion and the shaft throughout the operation of said means.

4. Power-transmission mechanism comprising, in combination with a gear and a motor-driven shaft, a pinion slidable, upon said shaft, into mesh with said gear; an overrunning clutch on the shaft; a shifting-member having positive connection with the pinion for rotating the pinion and yielding connection with the pinion for sliding the pinion on the shaft; helical connections between the shifting member and the clutch for producing positive relative rotation of said member and the shaft during movement of the shifting member; and means for moving the shifting-member in a direction to mesh the pinion with the gear.

5. Power-transmission mechanism comprising, in combination with a gear and a motor-driven shaft, a pinion slidable, upon said shaft, into mesh with said gear; an overrunning clutch of which one member is fixed to the shaft; a shifting-sleeve coaxial with the shaft and embracing the clutch, said sleeve having a straight spline connection with the pinion and a helical spline connection with the outer clutch-member; a spring interposed between the sleeve and the pinion for imparting yieldingly axial movement from the sleeve to the pinion; and means for moving the sleeve axially in opposite directions with respect to the shaft.

6. Power-transmission mechanism as defined in claim 5, in which the last-mentioned means comprises a spring enclosed within the sleeve and acting, between the shaft and the sleeve, to move the latter in a direction to cause disengagement of the pinion and the gear.

7. Power-transmission mechanism comprising: a gear; a driving pinion movable axially into and out of mesh with the gear; a shaft for driving the pinion and upon which the pinion is mounted to slide; a rotatable member movable along the shaft and having connections therewith such that axial movement of the member is accompanied by rotary movement; connections for imparting rotation from said member to said pinion while permitting relative axial movement between them; a spring for holding the pinion extended from said member; and manually operable means for moving said member.

8. Power-transmission mechanism comprising: a gear; a driving pinion movable axially into and out of mesh with the gear; a shaft for driving the pinion and upon which the pinion is mounted to slide; a rotatable member movable along the shaft and having an oblique spline connection with the shaft and having a longitudinal spline connection with the pinion; a spring for holding the pinion extended from said member; and manually operable means for moving said member.

9. Power-transmission mechanism comprising: a gear; a driving pinion movable axially into and out of mesh with the gear; a shaft for driving the pinion and upon which the pinion is mounted to slide; a sleeve slidable along the shaft and having an oblique spline connection with the shaft and having a longitudinal spline connection with the pinion; a spring enclosed by the sleeve for holding the pinion extended from the sleeve and manually operable means for moving the sleeve.

10. Power-transmission mechanism comprising: a gear; a driving pinion movable axially into and out of mesh with the gear; a shaft upon which the pinion is mounted to slide; a torque transmitting connection between the shaft and pinion and including a member having an oblique spline connection with the shaft and a longitudinal spline connection with the pinion; a spring for holding the pinion extended from said member; and manually operable means for moving said member.

11. Power-transmission mechanism comprising: a gear; a driving pinion movable axially into and out of mesh with the gear; a shaft upon which the pinion is mounted to slide; a torque transmitting connection between the shaft and pinion and including a sleeve having an oblique spline connection with the shaft and a longitudinal spline connection with the pinion; a spring enclosed by the sleeve for holding the pinion extended from the sleeve; and manually operable means for movnig the sleeve.

12. Power-transmission mechanism comprising: a gear; a driving pinion movable axially into and out of mesh with the gear; a shaft for driving the pinion and upon which the pinion is mounted to slide; a rotatable member movable along the shaft and having connections therewith such that axial movement of the member is accompanied by rotary movement; connections between said member and the teeth of the pinion for imparting rotation from said member to the pinion while permitting relative axial movement between them; a spring for holding the pinion extended from said member; and manually operable means for moving said member.

13. Power transmission mechanism comprising: a gear; a driving pinion movable axially into and out of mesh with the gear; a shaft for driving the pinion and upon which the pinion is mounted to slide; a sleeve slidable along the shaft and having an oblique spline connection with the shaft and having a longitudinal spline connection with the teeth of the pinion; a spring enclosed by the sleeve for holding the pinion extended from the sleeve; and manually operable means for moving the sleeve.

14. Power-transmission mechanism comprising: a gear; a driving pinion movable axially into and out of mesh with the gear; a shaft upon which the pinion is mounted to slide; a torque transmitting connection between the shaft and pinion and including a sleeve having an oblique spline connection with the shaft and a longitudinal spline connection with the teeth of the pinion; a spring enclosed by the sleeve for holding the pinion extended from the sleeve; and manually operable means for moving the sleeve.

In testimony whereof we hereto affix our signatures.

FARNUM F. DORSEY.
CHESTER W. CRUMRINE.